March 14, 1967 J. H. CARLSON 3,309,066
WINCHES HAVING OVERLOAD CONTROL MEANS
Filed May 6, 1965 7 Sheets-Sheet 1

Inventors
John H. Carlson
Alfred J. Kotek
By their Attorney

Carl E. Johnson

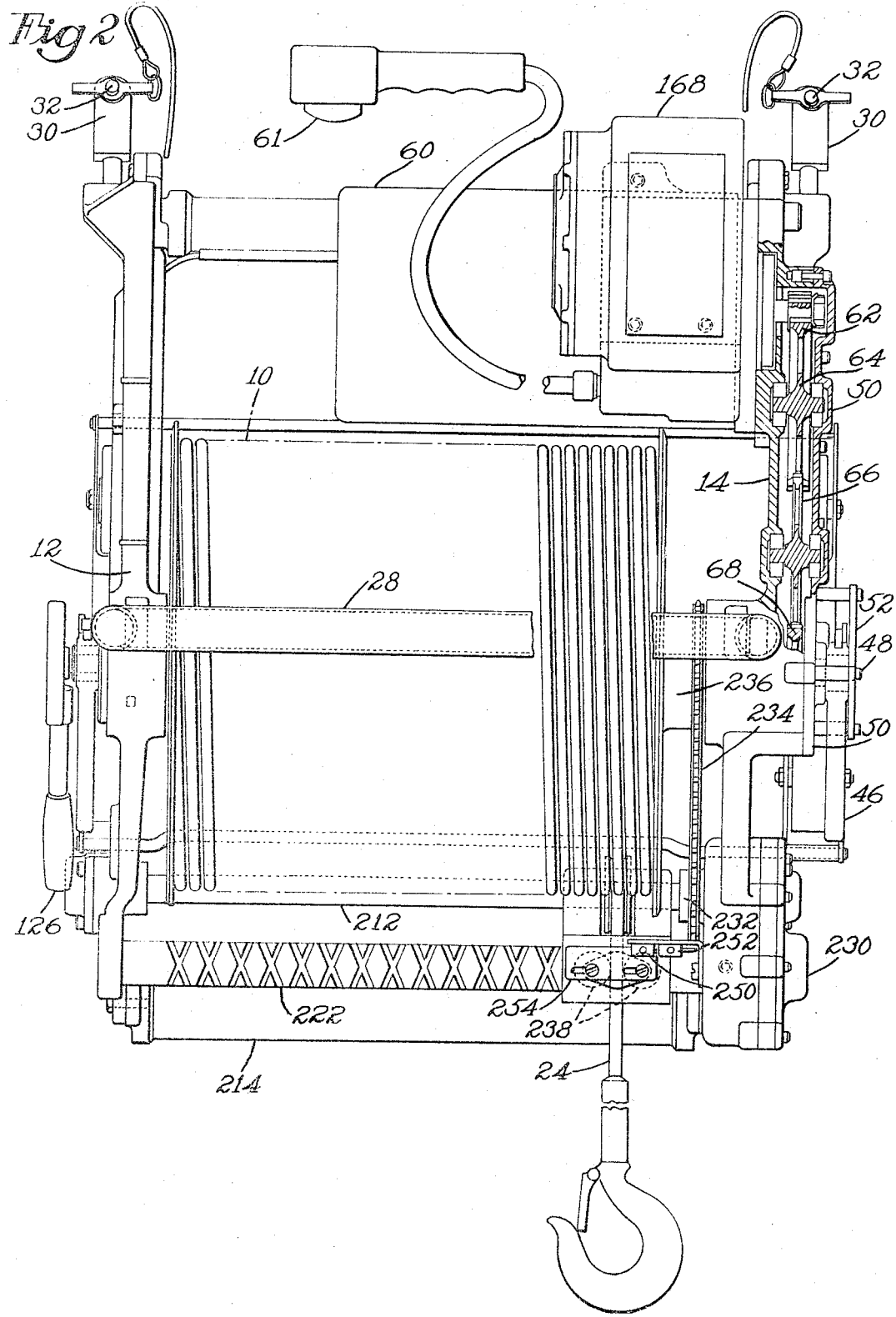

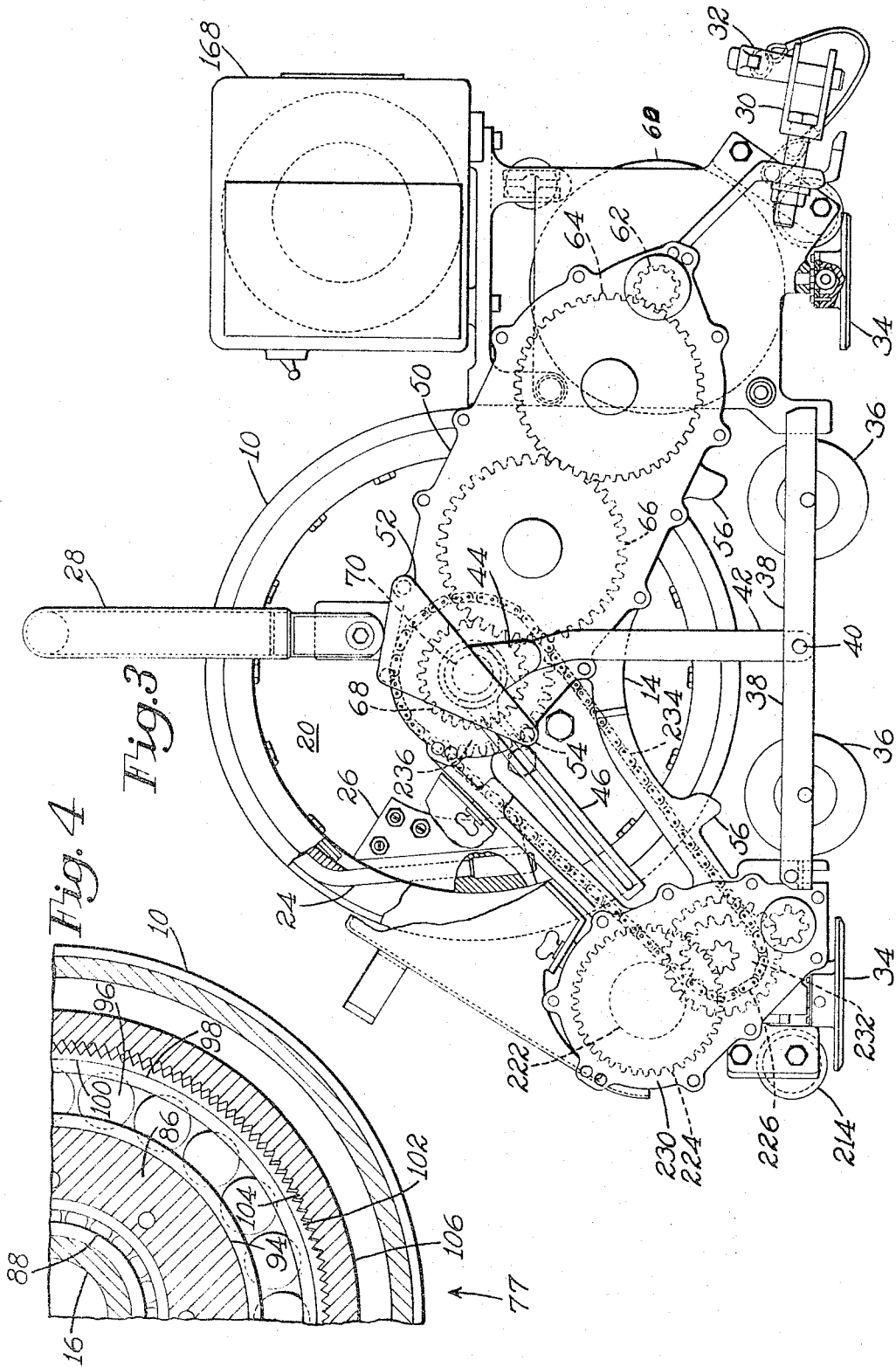

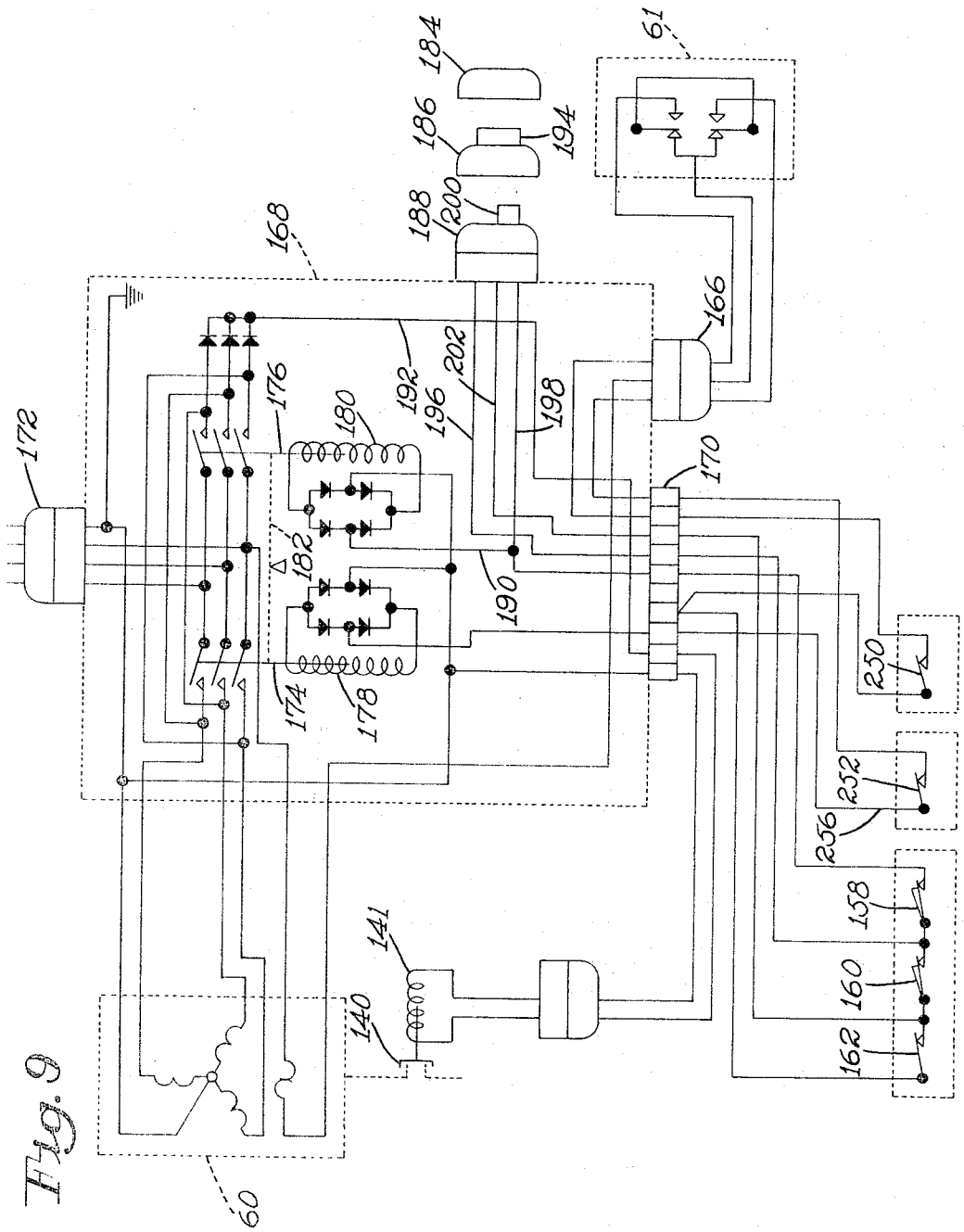

United States Patent Office 3,309,066
Patented Mar. 14, 1967

3,309,066
WINCHES HAVING OVERLOAD CONTROL MEANS
John H. Carlson, Danvers, and Alfred J. Kotek, Ipswich, Mass., assignors to United Shoe Machinery Corporation, Boston, Mass., a corporation of New Jersey
Filed May 6, 1965, Ser. No. 453,614
11 Claims. (Cl. 254—173)

This invention relates to cable pulling devices, and more particularly to power operated mechanism for controlling the winding drum of a winch or the like. As shown herein for purposes of illustration, the invention is embodied in a reversible, electric motor driven unit having a hauling or hoisting drum rotatable about a horizontal axis, the unit being especially well adapted, for instance, for mounting in aircraft for the handling of cargo. It will be understood, however, that application of the invention is not necessarily limited to loading or winding mechanism, nor to winches of the particular form disclosed herein, portable or otherwise.

In numerous operating situations there is need for versatile hauling, or lowering and hoisting equipment. Machines presently available for such work are often cumbersome, not easily controlled, and not adaptable to deal with different loads under different operating conditions. In connection with aircraft mounted cargo handling devices, for example, and also for other load handling mechanism, it is highly desirable that size and weight of a hauling unit for a given load capability be as low as possible without sacrificing reliability, simplicity of maintenance, or efficiency.

In view of the foregoing it is a primary object of this invention to provide an improved lightweight, compact winch mountable with ease on a supporting structure and safely operable to haul in or pay out load-connected cable without danger of overloading the supporting structure or the cable.

Another and more specific object of this invention is to provide, in a power operated winch having a rotary cable winding drum, means for selectively limiting operating tension in the cable when under load, and means for shifting the drum, when the cable is not under tension, to and from a free wheeling condition wherein the cable may be easily unreeled or reeled manually on the drum.

To these ends and in accordance with a feature of the invention there is provided a novel, rigid yet lightweight, winch mounting means or frame comprising a pair of spaced, A-shaped side members the lower extremities of which are connected by a pair of cross braces, and the apices of which are connected by a tubular axle or beam. This frame, and more especially its beam, supports a rotary cable-winding drum, its main reduction drive means internally thereof, and winch brake or load sensing safety devices. Accordingly the cable, which is guided back and forth across the front of the winch in advantageous time relation to the surface speed of the drum, exerts on the beam and hence on the frame a force which is thereby transmitted and beneficially dispersed via the side members to structure supporting the winch, for instance the floor of an aircraft. In addition to resisting loads imparted to the drum, the beam advantageously acts as a "backbone" for the winch in providing reaction torque to the speed reducer transmission.

The illustrated winch shown herein is driven from an electric motor incorporating a fail-safe brake mechanism for holding a load in the position occupied if or when power is lost. The brake is mechanically applied and electromagnetically released. In order that the illustrative winch may be adapted to handle more than one load range, as may be imposed by safety factors, overload sensing means are provided to insure that, for each preset range, neither the cable nor the winch supporting structure (for instance a particular airframe installation) will be overloaded. For this purpose, and in accordance with a further feature of the invention, one of the reduction gear elements is mounted in a load sensing cage within the drum, and the cage is grounded to the mentioned beam of the winch frame by spring means reflecting the torque being transmitted to the drum. The illustrative arrangement is such that one or more adjustable preset switches secured to the beam are successively actuated by the cage if tension on the cable exceeds selected values, thereby operating circuitry effecting automatic holding by the motor brake at a selected torque limit.

Another feature of the invention resides in the provision of means under the control of an operator whereby, under no-load conditions, the winch drum normally connected in driven relation to its internal reduction gearing can conveniently be manually disengaged therefrom. Preferably, and as herein shown, in order to gain the advantage of a high speed prime mover the speed reduction mechanism comprises a first stage planetary drive, and a second stage in the form of a harmonic drive unit. The latter, as disclosed for example, in United States Letters Patent No. 2,906,143, issued Sept. 29, 1959, in the name of C. W. Musser, includes a circular spline which is herein shown as secured to the above-mentioned beam, a flexspline for driving the drum and having mating engagement with the circular spline, and a wave generator driven by a planet gear of the first stage for circumferentially maintaining and propagating the spline driving engagement. An operating member which, when the winch cable is under tension, cannot be shifted to disengage the circular spline from its beam engaging position because of frictional drag, becomes shiftable by the operator under no-load condition to enable him thus to unclutch and rotate the drum freely. Thus, for example, he may unwind 200' of wire rope or cable from the drum with only a manual pull of 20 lbs. in less than one minute.

The above and other features of the invention, together with various novel details of construction and combinations of parts, will now be more fully described in connection with an illustrative embodiment and with reference to the accompanying drawings, in which:

FIG. 2 is a plan view of the winch shown in FIG. 1 with portions broken away to indicate construction details;

FIG. 3 is a view in side elevation with a frame portion and guard cover broken away and showing a portion of drum operating mechanism of the winch, its supporting wheels being shown in operative position;

FIG. 4 is an enlarged quarter sectional view of a harmonic drive stage of the drum operating mechanism, the section being taken on the line IV—IV of FIG. 6;

FIG. 9 is a schematic wiring diagram of the control circuit for the winch.

Figure 1:
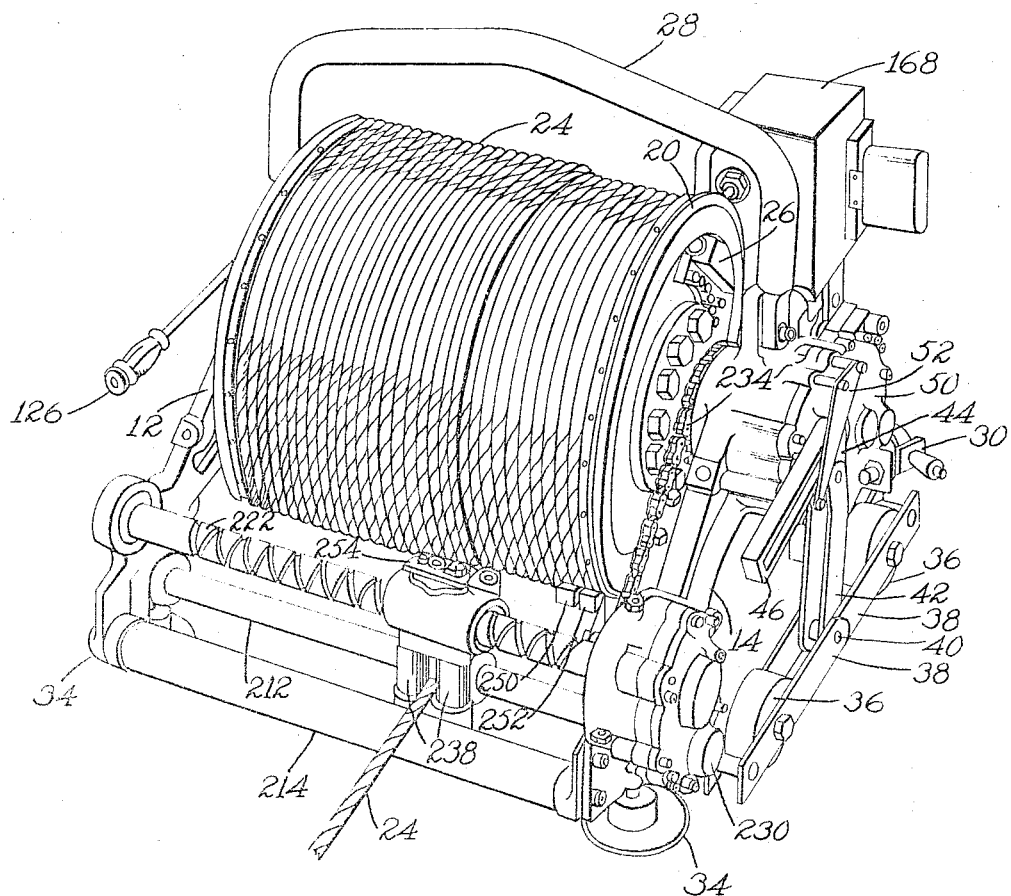
FIG. 1 is a perspective view of a portable cargo handling winch, its guard cover removed, and adapted for mounting, for instance, in aircraft.
Figure 5:
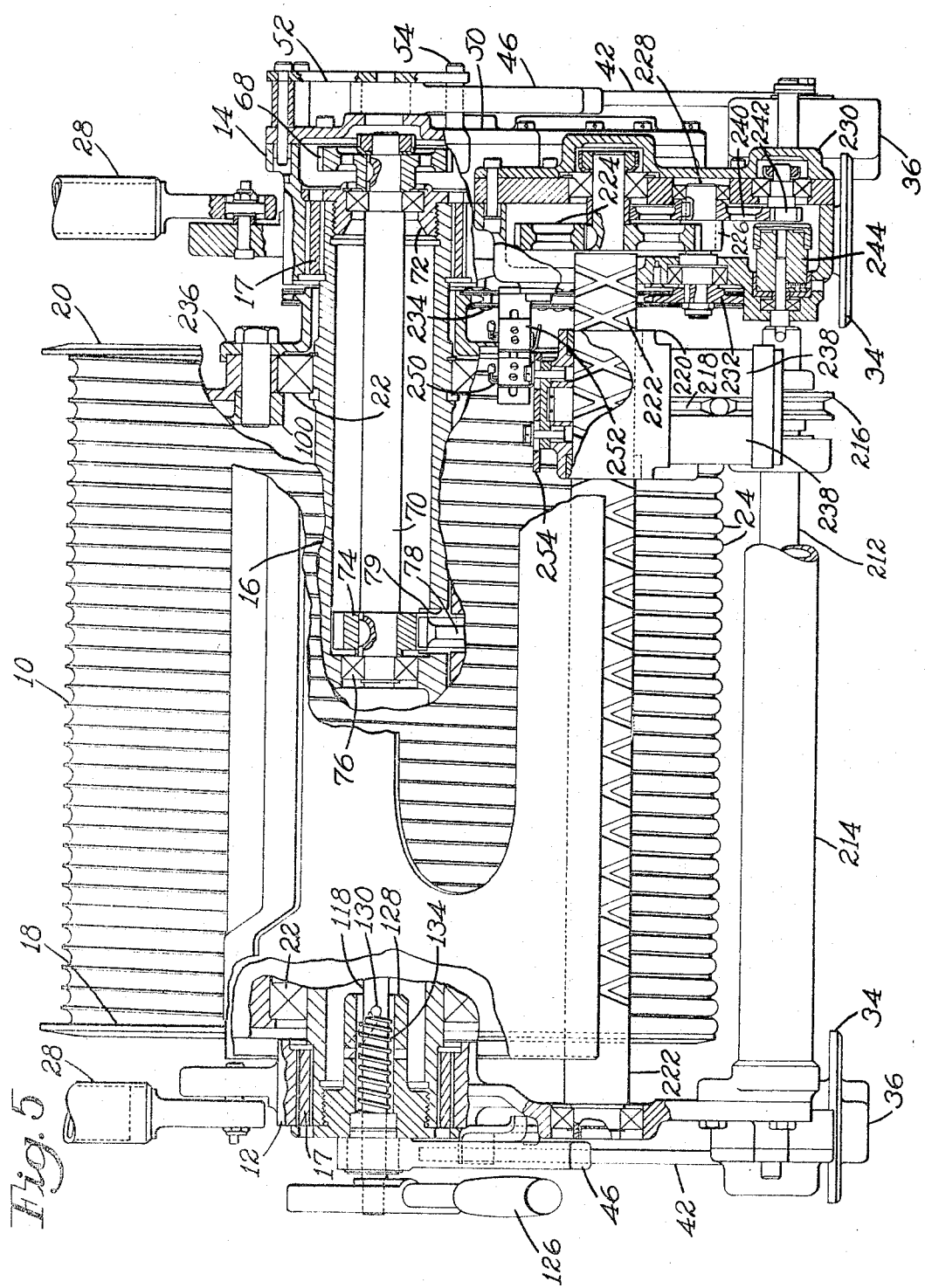
FIG. 5 is a view in front elevation with portions of the winch including its drum broken away to reveal frame construction including a stationary beam and associated control mechanism.
Figure 6:
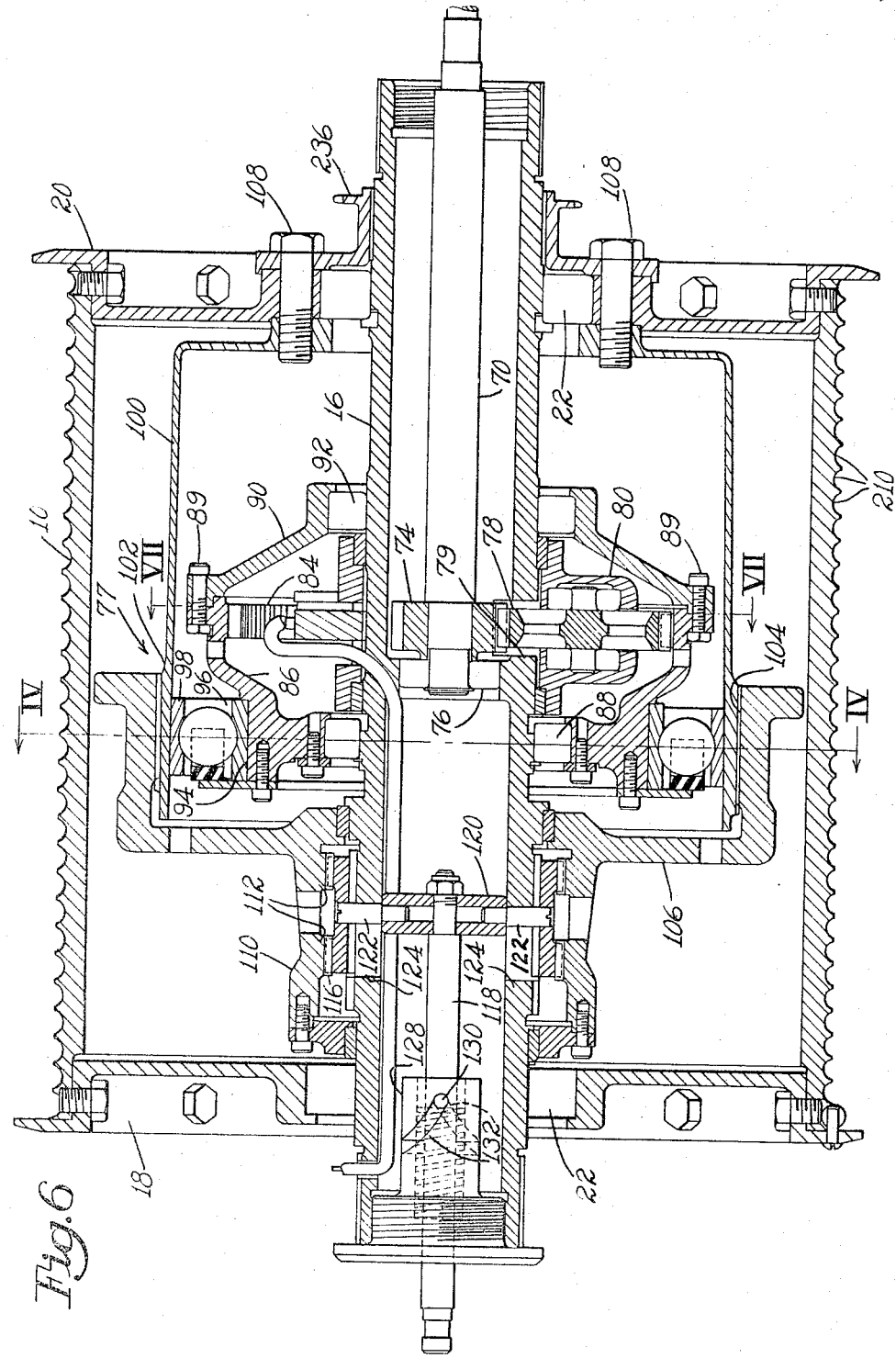
FIG. 6 is an axial section of the beam-mounted drum shown in FIG. 5 together with its internal harmonic drive, torque limiting means, and unsplining mechanism.

The illustrative winch comprises a horizontal cable carrying drum 10, winch mounting means including a main frame consisting of a pair of generally A-shaped side members 12, 14 (FIGS. 1, 2 and 5), and a rigid tubular beam 16 (FIGS. 5–8) interconnecting the side members preferably at their apices. The beam 16 is itself stationary. In order to permit the beam to be adjustably anchored at a selected angular position in the members 12, 14, rings 17, 17 (FIG. 5) have internal and external splines differing in number, the external engaging with splines on the members 12, 14, respectively, and the internal engaging with axial splines formed on the ends of the beam. This construction permits minimizing an out of phase relationship of the beam to the side frames, and of the side frames 12, 14 to supporting structure. Usage of only a single ring 17 at one end of the beam 16, in lieu of rings 17 at both beam ends, is often an acceptable and convenient way of minimizing such out of phase relationship. The beam rotatably supports the drum by means of spaced end plates or disks 18, 20 respectively bolted to the drum and journaled on the beam by bearings 22, 22 (FIG. 6). An enlarged end of a wire cable or rope 24 (FIGS. 1, 2, 5) passing through the drum, to be reeled in on the drum or payed out therefrom as hereinafter explained, is anchored in a block 26 (FIGS. 1 and 3) secured to the disk 20. To facilitate lifting of the winch it preferably has a handle 28 pivotally connected to the apex portions of the side members 12, 14 and to enable the winch to be secured in a selected operating position, for instance on such supporting structure as the floor of a cargo plane, a clevis 30 (FIG. 3) is secured to the rear leg of the respective side members and provided with a locking pin 32 for receiving a floor ring of the aircraft.

For transmitting the weight of the winch and its operating loads to the supporting structure the front and back legs of the side members carry self-leveling pads or plates 34 (FIGS. 1 and 3), respectively. The winch may be lowered onto its plates 34 by approximately similar manual means located on each side of the winch, and one (that shown in FIG. 3) of which will be explained, the winch normally being first rolled into position on four rollers 36, two being disposed on each side. These rollers are each carried by a forked toggle lever 38, the two levers 38 on each side being pivotally connected at their inner ends by a knee pin 40 to provide toggles 38, 38 (one only shown in FIG. 3). Front and rear ends of these levers are pivoted to the side frames by pivot rods carried thereby. A toggle operating link 42 (FIG. 3) carrying the pin 40 is pivoted at its upper end to one arm 44 of an operating lever having a slotted arm 46. This lever is fulcrumed on a pin 48 (FIG. 2) mounted in a gear cover 50 (FIGS. 1–3) secured to the side member 14. For a reason about to be noted the pin 48 is also supported in a triangular plate 52 secured to the cover 50. Accordingly, when the lever 46 is turned clockwise as seen in FIG. 3 to shift its slotted arm 46 from a stop pin 54 in the plate 52, the straightened toggle 38, 38 is broken until the arm 44 abuts the stop pin 54, the rollers 36, 36 thus being lifted relatively to the winch and the adjacent plates 34 lowered for engagement with the supporting structure. The rollers 36 now respectively engage abutments 56 (FIG. 3) formed on the side members 12 and 14.

For rotatably and reversibly driving the cable winding drum 10 about the longitudinal axis of the tubular beam 16 therein, an electric motor 60 (FIGS. 2, 3 and 9) responsive to a pendant control 61 is secured to the side member 14 and drives through gearing next to be explained. Referring to FIGS. 2 and 3, a motor drive pinion 62 disposed within the enclosure provided by the gear cover 50 operates a train of gears 64, 66 and 68 respectively journaled therein, the latter being keyed on the outboard end of an input shaft 70 (FIGS. 3, 5, 6 and 7) coaxial with the stationary "backbone" or reaction beam 16. For thus supporting the shaft 70, its outboard end is journaled within a hub 72 (FIG. 5) axially threaded into the beam thereby also supporting side frame 14, and the inboard end of the shaft 70 driving an input spur gear 74, is supported by a bearing 76 (FIGS. 5 and 6) disposed in the beam 16 preferably about midway of its length and midway of the axial length of the drum 10.

Figure 7:
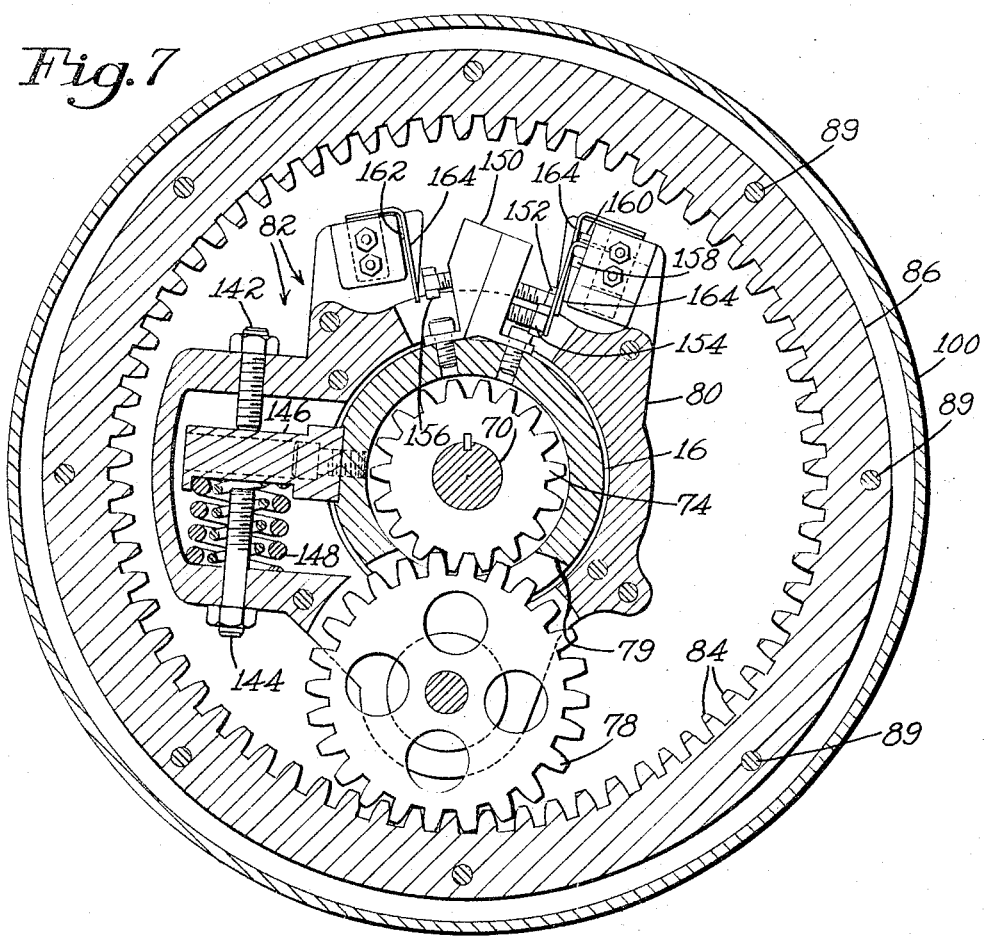
FIG. 7 is a section taken on the line VIII—VIII of FIG. 6.

Since it is desirable from weight considerations to employ as prime mover for the winch the motor 60 which runs at high speed (for instance over 10,000 r.p.m.), it is important to deliver its power to the drum 10 via a compact transmission having high torque to weight capacity while providing a high reduction ratio. The reduction gearing preferably comprises as next explained a first stage planetary transmission driven from the spur gear 74, and a second stage in the form of a harmonic drive generally designated 77 (FIGS. 4 and 6) for regulating operation of the drum. Referring mainly to FIGS. 6 and 7, a planet gear 78 extending through a slot 79 in the beam 16 and meshing with the spur gear 74 is rotatably carried by a cage 80 journaled for relative coaxial rotation on the beam 16. The cage 80 also serves, as will later be explained, an automatic torque sensing and load limiting mechanism generally designated 82 (FIG. 7) by reason of the manner in which it and the beam are grounded to provide reaction to the rotary drive. The speed of the input shaft 70, much reduced, is then transmitted from the planet gear 78 to spline teeth 84 (FIGS. 6 and 7) formed internally on a harmonic drive wave generator 86. The teeth 84 and the cage 80 are concentric. The wave generator 86 is rotatably supported on one side by a bearing 88 (FIG. 6) on the beam, and for better dynamics is also secured circumferentially on its other side by bolts 89 (FIGS. 6 and 7) to a dish-like plate 90 mounted on a bearing 92 on the beam.

As shown in FIGS. 4 and 6 the harmonic drive unit 77 comprises the wave generator 86 having an external ellipsoidal cam surface 94 with major and minor axes, and a wave generator ball bearing 96 mounted on that surface and radially deflected thereby to ellipsoidal shape to impart, via its outer race 98, a circumferential wave of radial deflection to the open end of a cup-shaped flexspline 100 coaxial with the beam. The driven wave generator 86 thus rotates the major axis of a corresponding ellipsoidal shape in the flexspline 100 and effects interengagement at diametrically opposite localities of external spline teeth 102 on the flexspline with a circular ring of spline teeth 104 formed internally on a rigid circular spline 106. As is conventional in harmonic drive units, the flexspline teeth 102 are less in number by two or a multiple thereof than the teeth 104. As herein illustrated, when the winch is power driven the circular spline 106 is coaxially coupled to the beam 16, as will be described, in order to function as a reaction means for the power transmission. The flexspline 100 reacts on the circular spline 106 to transmit rotational output to the drum. For this purpose the inturned end of the flexspline 100 is secured by bolts 108 (FIGS. 1 and 6) to the disk 20. It will thus be clear that the central input from within the beam advantageously enables the transmission to deliver a pure torsion output and to be divorced from the load-bearing structure.

Figure 8:
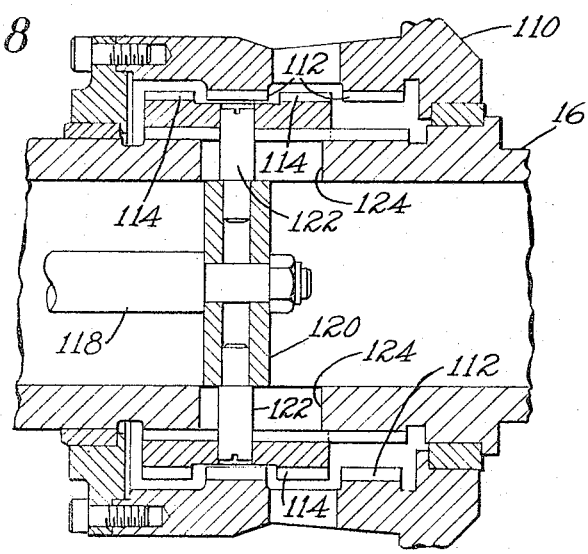
FIG. 8 is an enlarged sectional view of a portion of the mechanism shown in FIG. 6 for unsplining the drum, the parts now being unclutched.

For normally coupling the circular spline 106 in a reactive relation on the beam 16, a hub 110 (FIGS. 6, and 8) of the circular spline is internally formed with axially spaced sets of splines 112, 112 (FIGS. 6 and 8) respectively interengageable with corresponding sets of splines 114, 114 formed on an axially slidable shifter 116. For manually disengaging or unclutching the drum 10 when the cable 24 is not under tension so that, if need be, the free wheeling drum may quickly pay out or wind in the cable by hand control, an operating shaft 118 for the shifter 116 is provided. The shaft 118 extends axially into the beam 16. On a reduced portion of the inboard end of the shaft 118 is a rotatably mounted holder 120 diametrically receiving setscrews 122 which respectively extend radially through the shifter 116 and opposed axial slots 124 of the beam 16. The outboard end of the operating shaft 118 is provided with a crank arm 126 (FIGS. 2 and 5) and is coaxially rotatable in a sleeve 128 (FIGS. 5 and 6) which is threaded into an end of the beam 16 thereby also supporting side member 12. A pin 130 radially projecting from the shaft 118 extends into a helical slot 132 (FIG. 6) formed in the sleeve 128. It will thus be understood that angular movement of the arm 126 between its full-line and dotted-line positions shown in FIG. 5 is effective axially to move the shaft 118 and the setscrews 122, and hence the shifter 116 between an engaged position (FIG. 6) and a disengaged position (FIG. 8). In the latter condition, there being no reactionary force provided by the beam 16 to the circular spline 106, this spline together with the flexspline 100 and the cable drum 10 may freely rotate until the crank arm 126 is turned to reengage the splines 112, 114. A compression spring 134 (FIG. 5) in the sleeve 128 urges the pin 130 to maintain engagement of the splines 112, 114.

The load limiting mechanism 82 next to be described is provided for insuring that neither the cable 24 nor the particular aircraft floor or other winch supporting structure, will be overstressed in the course of winch operations such as cargo loading. To this end the cage 80 (FIGS. 6 and 7) acts as a dynamic load sensor by having a mechanically grounded or limited yielding connection to the winch frame. Preferably this connection is in the form of spring means calibrated to progressively respond to and reflect torque being transmitted to the winding drum 10 by the motor 60. The arrangement now to be explained is such that a "fail-safe," or normally inoperative, mechanically applied brake 140 (FIG. 9) releasable electromagnetically by a relay 141 associated with the motor 60, will sustain the winch load on being actuated by circuitry including switches controlled by the mentioned spring means. While in some cases a winch need only be provided with one traction or overload safety limit at which a drive motor would be braked, it is especially advantageous in the case of portable winches adapted for mounting on various structures capable of supporting widely differing load limits (as for instance aircraft frames), that safe operation in more than one, and in the illustrative winch, three successive load limit operating ranges be selectively available.

The cage 80 threadedly carries axially alined stop studs 142, 144 (FIG. 7) the adjacent ends of which are respectively engageable with opposite sides of a block 146 fixedly secured to, and radially extending from, the beam 16. In the absence of input shaft torque and while torque output remains low, the cage 80 is rotatively positioned on the beam by a compound compression spring 148 acting between the block 146 and an inner wall of the cage to effect engagement of the stud 142 with the block as shown in FIG. 7. As the winch is subjected to increasing operating load, the cage 80 is rotated about the beam against the calibrated restoring force exerted by the spring 148, and clockwise as seen in FIG. 7. Such rotation of the cage is caused by operation of a resultant force acting on the mounting center of the planet gear 78 and created by the combination of an input vector exerted on the planet gear 74, and a reaction vector exerted on the gear 78 by the wave generator 86. The angular displacement of the cage occurs in proportion to the load or tension in the cable 24 up to an adjustable maximum determined by the setting of the stud 144 in relation to the block 146. Though not illustrated, the arrangement could be such that, on engagement of the stud 144 and the block 146, the brake 140 would become operative to hold the drum 10 and deenergize the motor 60. Instead of providing this single maximum torque limit in the illustrative winch, three selectable torque ranges (within the maximum referred to) are made available by control circuitry next to be described.

Referring to FIGS. 7 and 9, there is secured to the beam 16 a block 150 into which three switch actuator studs 152, 154 and 156 are adjustably threaded. For cooperation with these studs respectively, there is fixedly mounted on the cage 80 three normally closed switches 158, 160, 162. Each of the latter is normally held closed by the influence of the spring 148 and carries a leaf spring 164. The springs 164 are arranged yieldingly to engage the studs 152, 154 and 156 respectively, successively to actuate the switches 158, 160 and 162 as increasing torque is exerted. Thus three load ranges, for instance, up to 4500 lbs., 4500–5600 lbs., and 5600–7000 lbs., are determined selectively as will be described.

As shown in FIG. 9 the motor control pendant 61, which is a single button, reel-in or reel-out type, is connected by a plug 166 to a junction box 168 (FIGS. 1–3 and 9) secured to the winch frame. A terminal block 170 associated with the box 168 connects the switches 158, 160, 162 into the control circuit. The switches 158, 160 are both of normally open-held closed type, while the switch 162 is of a normally closed type. For connecting the winch to an A.C. source of power, a plug 172 connects to the box 168 and energizes the motor field for reel-in or reel-out drive according to whether a 3-pole switch 174 or 176 (FIG. 9) is closed by operation of the pendant control 61. (The latter is so constructed that one or the other of its two pairs of contacts can be closed but never both.) The switches 174, 176 are operated by energization of relays 178, 180 respectively, only one of the relays being operable at any one time by reason of their respective rectifiers and a fulcrumed tie bar 182 schematically shown in FIG. 9.

The maximum torque limit to be exerted by the winch is selected by connecting into the junction box 168 one of three alternative selector plugs 184, 186 or 188 (FIG. 9) which thereby determines whether the corresponding torque lever switch 158, 160 or 162, is to be effective to deenergize the energized one of the relays 178, 180, and hence the motor 60, and also simultaneously to deenergize the relay coil 141 for releasing the brake 140 for mechanical application. Thus, for example, if the selector plug 184 is used to limit load to 4500 lbs., on reaching this selected maximum traction, the cage 80 (FIG. 7) will have turned about the beam 16, by reason of reactive torsion, sufficiently to allow the spring 164 engaging the stud 154 to open the switch 158. This deenergizes a line 190, the energized relay 178 or 180, the motor 60, and a line 192 otherwise effective to energize the brake relay 141. If the selector plug 186 is instead used, the switch 158 opens first but is of no effect as torque increases, and at 5600 lbs. the spring 164 engaging the stud 152, responsive to the additional output, permits the switch 160 to open. Now a wire 194 of the plug 186 that had effectively connected a line 196 to a line 198 (FIG. 9) is deenergized and the line 190 along with the motor 60 are deenergized as its brake 140 is made effective, as previously explained. If alternatively the selector plug 188 be inserted as shown in FIG. 9 to limit the maximum torque to the 7000 lb. level, it is the normally closed switch 162 which is finally open on reaching the selected torque level by reason of its spring 164 engaging and being depressed by the stud 156. Accordingly, a wire 200 of the plug 188 which had effectively connected a line 202 (FIG. 9) to the lines 198 and 190 now effectively disconnects the line 202 and 190 to deenergize the motor 60 and actuate its brake 140 as before described, thereby preventing excessive loads which might damage the supporting structure, the cable, or possibly the winch itself.

The illustrative winch drum 10 is formed with spiral fluting 210 (FIG. 6) to accommodate a double lay of cable 24. It is of course essential to insure that there will be no overwinding of the cable onto the drum and that, conversely, there will be no excessive unreeling of the cable, it being determined that a minimum of three turns is desirable to avoid cable slippage. Safety mechanism for these purposes will next be explained in conjunction with means for level winding of the cable. A pair of cross bars 212, 214 (FIGS. 1, 2 and 5) for bracing the winch have their ends supported in the lower front legs of the side members 12, 14. The bar 212 is rotatably driven as later explained and carries a lower pulley 216 (FIG. 5) keyed thereon over which the unwound cable 24 runs. This cable passes beneath a cooperating idler pulley 218 rotatably carried by, and yieldingly limited heightwise in a casting 220 which is formed with a bore for sliding along the cross bar 212. In order to propel the casting 220 first in one direction axially of the drum 10 and then reversely, a screw shaft 222 has a single lead left-hand helical groove which continues into a right-hand helix at one extremity thereby allowing the two lays of cable to be wound without reversing rotation of the screw shaft. The shaft 222 is journaled in the side members 12, 14 and extends through a horizontal bore of the casting 220, the follower (not shown) fixedly secured therein engaging in the groove of the shaft 222 to translate the casting. As shown in FIG. 5 the right-hand end of the shaft 222 carries a drive gear 224 meshing with a pinion 226 keyed on a stub shaft 228 that is journaled in the side member 14 and a gear cover 230 secured thereto. For rotating the shaft 228 its inner end is keyed to a sprocket 232 drivingly connected by a chain 234 to a sprocket 236 (FIGS. 3, 5 and 6) which is secured to the drum plate 20 by the bolts 108. It will be understood that the rate of traverse effected in the casting 220 as the cable is payed out or reeled in between vertical guide rolls 238, 238 carried by the casting is at all times in accord with the rotational speed of the drum 10 thus effecting level winding of the cable turns on the drum.

The level wind arrangement just described is further such that during no loading of the cable, for instance when the drum is unsplined for free wheeling, spooling and excessive slack in the cable are prevented. To this end a gear 240 (FIGS. 2 and 5) on the stub shaft 228 meshes with a gear 242 to drive the shaft 212 through a one-way clutch 244 (FIG. 5) and hence its cable engaging pulley 216, the speed of this pulley being such that, during unreeling of the drum 10, the pulley is rotating somewhat faster and hence frictionally exerting a small and desirable tension on the cable to control its position as it is unwound. On the other hand, during reeling-in under no load, the downwardly urged upper pulley 218 tends to exert a drag for controlling unwound cable.

Bracketed to the member 14 is a pair of normally closed switches 250, 252 (FIGS. 1, 2, 5 and 9) respectively controlling cable underwind and overwind. Adjustably mounted on the casting 220 in selected axial relation to the screw shaft 222 is a plate 254 arranged to actuate the switches 250, 252 successively.

Preferably the plate 254 is adjusted so that, after the required number of revolutions of the shaft 222 for winding on two complete cable lays or unwinding all but three turns of cable, the switch 252 or the switch 250 will be opened. Both of these switches are connected to the pendant control 61, the switch 250 to the unwind contact, and the switch 252 to the wind contact through the junction box 168 and the terminal block 170. The opening of the unwind limiting switch 250, which is in series with the maximum torque level switch 162, accordingly stops the motor 60 and brakes it as above explained. The overwind switch 252 when opened has the same effect since its line 256 (FIG. 9) is now in effect disconnected (through the block 170 and the energized one of the relays 178 or 180) and deenergizes the motor 60.

From the above it will be clear that a compact winch of reliable design is provided. Reaction force due to cable tension is exerted at each end of the drum, through its bearings, to the beam. An opposed, proportional reaction torque from the power transmission is applied to the ends of the beam thereby advantageously minimizing a tendency to torsional twisting in the main frame of the winch.

Having thus described our invention, what we claim as new and desire to secure by Letters Patent of the United States is:

1. A winch comprising a main frame provided with a rigid cross beam, a cable-carrying drum rotatably mounted on the cross beam, motor means including a mechanically effective and electrically releasable brake for regulating rotation of the drum, speed reducer mechanism operatively connected between the motor means and the drum, a member in the drum yieldingly displaceable with respect to the beam, upon operation of said speed reducer mechanism, from a zero or low input torque position according to output torque being exerted by the drum, and a control circuit for said brake including a switch adjustably secured to the cross beam for selectively limiting said output torque, said switch being disposed for actuation by said member.

2. A winch as set forth in claim 1 wherein said speed reducer mechanism includes a harmonic drive unit consisting of a wave generator, flexible spline, and a circular spline arranged coaxially with the drum, and internally thereof, one of these two splines constituting a torque reaction member secured to the beam, and the other being operatively connected to the drum.

3. A winch as set forth in claim 2 and further characterized in that said cross beam is tubular and coaxial with the drum, a gear of said speed reducer mechanism being operable through a slot in the beam to drive said wave generator.

4. A winch as set forth in claim 3 wherein the flexible spline is cup-shaped and has its inturned end portion connected to an end plate of the drum, the circular spline is normally said torque reaction member and secured to the beam, and operator controlled means is provided for disengaging the beam from the circular spline to permit free wheeling of the cable-carrying drum.

5. A winch comprising a cable-winding drum, a main frame including a pair of side A-frames, a beam interconnecting said A-frames for rotatably supporting the drum, power means for reversibly driving said drum and including a combination planetary-harmonic drive speed reducer disposed therein, a brake associated with said power means for sustaining a load on said cable in the event of power failure in the power means, and overload safety means including a control circuit adapted to be operatively connected to said brake, a plurality of switches in said control circuit adjustably secured, respectively, to said beam, to define the upper and lower limits of successive torque ranges exertable by the drum, and a torque responsive member rotatable relatively to the beam in proportion to the torque reacted in said speed reducer to actuate a selectable one of said switches.

6. A winch comprising a cable-winding drum, means including a stationary tubular beam coaxial with the drum for rotatably supporting it, power means for operating the drum including a prime mover, an input member extending within said beam, a planet gear driven by said member and a rotatable cage coaxial with the beam for carrying said gear, calibrated spring means for yieldingly positioning the cage angularly with respect to the beam in response to torque being delivered to the drum by said power means, and an overload control circuit for said power means operable to deenergize and brake the latter at a selected angular position of said cage.

7. A winch as set forth in claim 6 and further characterized in that said power means includes a harmonic drive unit in driven relation to said planet gear and having a reaction relation to said beam.

8. A winch as set forth in claim 7 wherein manual control means is provided for disrupting the reactive relation of the harmonic drive unit and said beam to permit free wheeling of the drum, said control means comprising an axially movable shifter which, in operative position, connects the beam to one of the gears of said harmonic drive unit and, in inoperative position, disconnects said one gear from the beam.

9. In a power operated winch supported by a structure and having a cable winding drum rotatable about an axis, and mechanism for rotating the drum about said axis to control operating movement of said cable, means mountable on said winch supporting structure for transmitting and dispersing operating loads thereto, said mountable means comprising a pair of spaced side frames, a stationary beam rigidly interconnecting upper portions of said side frames, respectively, for rotatably supporting the winding drum and at least a portion of said mechanism, and an internally and externally splined ring arranged at one end of the beam and interengaged with a splined end of the beam and the adjacent side frame to minimize an out of phase relationship of the beam to the frames and of said frames to said supporting structure.

10. In a power operated winch supported by a structure and having a cable winding drum rotatable about an axis, and mechanism for rotating the drum about said axis to control operating movement of said cable, means mountable on said winch supporting structure for transmitting and dispersing operating loads thereto, said mountable means comprising a pair of spaced A-shaped side frames, a stationary beam rigidly interconnecting apex portions of said side frames for rotatably supporting the winding drum and at least a portion of said mechanism, and internally and externally splined rings respectively interengaged with splined ends of the beam and the adjacent side frames to minimize an out of phase relationship of the beam to the frames and of said frames to said supporting structure.

11. A winch as set forth in claim 10 and further characterized in that the number of external spline teeth on at least one of said rings slightly differs from its number of internal spline teeth to permit angular adjustment.

References Cited by the Examiner

UNITED STATES PATENTS

| 1,578,965 | 3/1926 | Eck | 254—186 |
| 1,763,023 | 6/1930 | Tyler | 254—186 |

FOREIGN PATENTS

| 861,481 | 2/1941 | France. |
| 833,660 | 4/1960 | Great Britain. |

EVON C. BLUNK, *Primary Examiner.*

H. C. HORNSBY, *Assistant Examiner.*